(12) United States Patent
Tayo

(10) Patent No.: US 10,173,611 B2
(45) Date of Patent: Jan. 8, 2019

(54) VEHICLE PROTECTION DEVICE

(71) Applicant: Adekunle Tayo, Richmond, TX (US)

(72) Inventor: Adekunle Tayo, Richmond, TX (US)

(*) Notice: Subject to any disclaimer, the term of this patent is extended or adjusted under 35 U.S.C. 154(b) by 232 days.

(21) Appl. No.: 15/179,950

(22) Filed: Jun. 10, 2016

(65) Prior Publication Data
US 2017/0355323 A1 Dec. 14, 2017

(51) Int. Cl.
*B60R 13/04* (2006.01)
*B60J 11/06* (2006.01)

(52) U.S. Cl.
CPC .............. *B60R 13/04* (2013.01); *B60J 11/06* (2013.01)

(58) Field of Classification Search
CPC ............ B60R 13/04; B60J 11/06; B60J 11/08
USPC ...... 296/136.07; 280/770; 150/166; 293/127
See application file for complete search history.

(56) References Cited

U.S. PATENT DOCUMENTS

| | | | |
|---|---|---|---|
| 5,209,545 A * | 5/1993 | Slaugh | B60J 11/06 150/166 |
| 6,371,547 B1 * | 4/2002 | Halbrook | B60J 11/00 150/166 |
| 6,719,339 B1 * | 4/2004 | Yoham | B60J 11/00 293/128 |
| 8,146,984 B2 * | 4/2012 | Devereaux | B60J 11/00 150/166 |
| 8,398,132 B2 | 3/2013 | Sturdee | |
| 8,590,951 B1 | 11/2013 | Calabro | |
| 2014/0190603 A1 * | 7/2014 | Cliett | B60J 11/06 150/166 |
| 2015/0258880 A1 | 9/2015 | Wheeler | |
| 2015/0001865 A1 | 1/2016 | McGee | |

* cited by examiner

*Primary Examiner* — Ruth Ilan
(74) *Attorney, Agent, or Firm* — South Texas College of Law Houston Patent Clinic

(57) ABSTRACT

Temporary vehicle protection devices and methods of using the same are generally described herein. The devises generally include a flexible form fitting strip of impact absorbing material adapted to encircle a vehicle when parked thus protecting the front, sides, and rear of vehicle and wherein the device secures to itself upon closure by a device locking mechanism.

14 Claims, 5 Drawing Sheets

VEHICLE PROTECTION DEVICE

STATEMENT REGARDING FEDERALLY SPONSORED RESEARCH OR DEVELOPMENT

Not Applicable.

FIELD

Embodiments of the present invention generally relate to vehicle protection devices.

BACKGROUND

The following includes information that may be useful in understanding the present invention but is not to be considered an admission that any of the information provided herein is prior art.

Vehicle owners share the frustration of returning to their parked vehicle and discovering a dent, scratch, or bump that was not present when the owner first parked the vehicle. There are products available that allow the owner to protect all sides of their vehicle. However, those are limited in functionality. It is desirable to protect each side of your vehicle from dents, scratches, or bumps from other vehicle operators nearby.

SUMMARY

One or more embodiments include temporary vehicle protection devices. The devises generally include a flexible form fitting strip of impact absorbing material adapted to encircle a vehicle when parked thus protecting the front, sides, and rear of vehicle and wherein the device secures to itself upon closure by a device locking mechanism.

One or more embodiments include the device of the preceding paragraph, wherein the device is adapted for securing to an interior surface of a vehicle window and extending through a vehicle door side panel without obstructing a locking mechanism disposed within the vehicle door to provide anti-theft; encircling the vehicle, and secured to itself by the device locking mechanism to close the strip.

One or more embodiments include the device of any preceding paragraph, wherein the vehicle protection device is adapted for installation by a single person.

One or more embodiments include the device of any preceding paragraph and further including embellishments or a decorative top layer material.

One or more embodiments include the device of any preceding paragraph, wherein the strip is collapsible for storage.

One or more embodiments include the device of any preceding paragraph, wherein the strip is formed of weatherproof and tear proof material.

One or more embodiments include the device of any preceding paragraph, wherein the closure is adapted to tighten the impact absorbing material encircling the vehicle to ensure a snug fit.

One or more embodiments include the device of any preceding paragraph, wherein the strip is formed of flexible elastic material adapted to form fit the vehicle corners and contours.

One or more embodiments include the device of any preceding paragraph, wherein the strip is designed for automobiles.

One or more embodiments include the device of any preceding paragraph, wherein the flexible form fitting strip includes PVC backed polyester or neoprene.

One or more embodiments include the device of any preceding paragraph, wherein the device is reinforced by stitched PVC backed polyester or neoprene.

One or more embodiments include the device of any preceding paragraph, wherein the device is secured to the vehicles window by suction cup, hook and loop strips, or adhesive.

One or more embodiments include the device of any preceding paragraph, wherein the device is secured to the device middle by at least one strap and loop, straps and buckle, strap and strap tie, strap and clip, turn-key holder, or clip and loop.

One or more embodiments include the device of any preceding paragraph, wherein the device is secured to the front passenger side door, the rear passenger side doors, or the front driver side door.

One or more embodiments include methods for protecting a vehicle. The methods generally include providing the temporary vehicle protection device of any preceding paragraph; securing the first end to an interior surface of a window in the vehicle; aligning a cut away hole in the first end with a door striker or door latch disposed within a vehicle door or frame; closing the vehicle door, wrapping excess material of the temporary vehicle protection device laterally around the vehicle, and securing the second end to a locking mechanism located on the device middle.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

BRIEF DESCRIPTION OF DRAWINGS

The claimed subject matter may be understood by reference to the following description taken in conjunction with the accompanying drawings, in which like reference numerals identify like elements, and in which:

FIG. 3 also illustrates a transparent device in the closed position to allow visualization of an installation of the vehicle protection device.

FIG. 4 also illustrates one embodiment of a location of a strategically placed cut away hole as to not obstruct the ability of the vehicle door to close.

Figure 1:
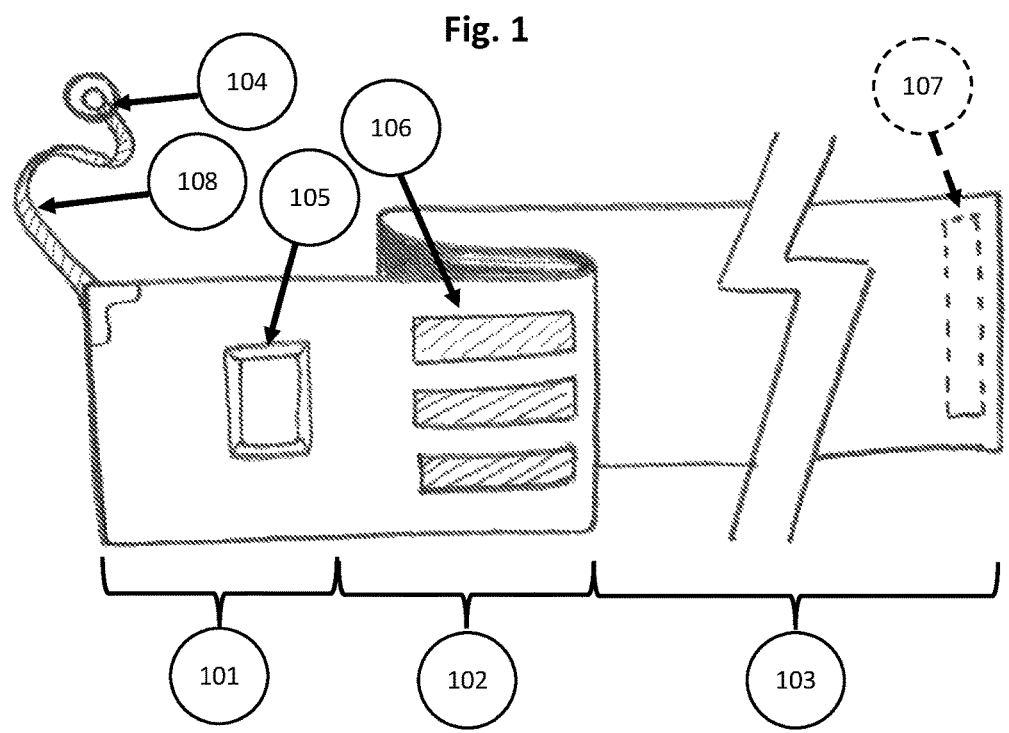
FIG. 1 illustrates a first end, a middle, and a second end of an embodiment of a vehicle protection device in the open position along with one embodiment of a securing method to attach the device to the surface of an interior window of a vehicle and one embodiment of a device locking mechanism to secure the second end to the middle of the device.
Figure 2:
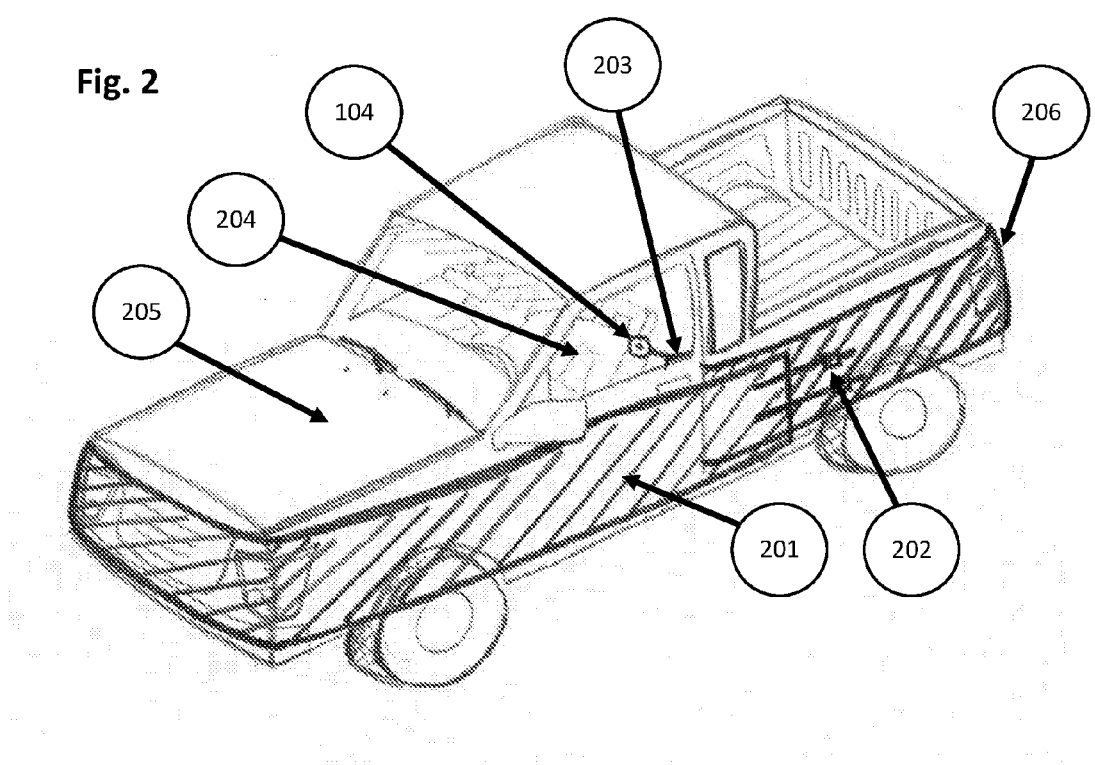
FIG. 2 illustrates a vehicle encircled by a vehicle protection device in the closed position with one embodiment of a device locking mechanism.

While the claimed subject matter is susceptible to various modifications and alternative forms, the drawings illustrate specific embodiments herein described in detail by way of example. It should be understood, however, that the description herein of specific embodiments is not intended to limit the claimed subject matter to the particular forms disclosed, but the contrary, the intention is to cover all modifications, equivalents, and alternatives falling within the spirit and scope as defined by the appended claims.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of the ordinary skill in the art having the benefit of this disclosure.

The embodiments illustratively disclosed herein suitably may be practiced in the absence of any element that is not specifically disclosed herein and/or any optional element disclosed herein.

Various terms are used herein are shown below. To the extent a term used in a claim is not defined below, it should be given the broadest definition skilled persons in the pertinent art have given that term as reflected in printed publications and issued patents at the time of filing.

Embodiments described herein generally relate to a vehicle protection device that encircles a vehicle laterally to protect the vehicle's outer finish surface against dents, scratches, or any other bumping hazards that would damage the vehicle outer finish surfaces while the vehicle is parked.

Generally speaking, a vehicle protection device is formed of a collapsible, weatherproof, and impact absorbing material that is adapted to laterally encircle a vehicle while the vehicle is stationary. The device may be designed to be utilized on all automobiles, containing or not containing passengers. Thus, the vehicle protection device may be composed of a collapsible, weatherproof, and impact absorbing material, such as polyvinyl chloride (PVC), polyester, neoprene or combinations thereof, for example. In one or more embodiments, the device is formed of at least two materials, such as a PVC backed polyester. The vehicle protection device generally includes a first end, middle, and a second end. The first end of the device may be attached to the interior surface of the vehicle window, pulled through the door side panel and aligned properly. Aligned properly is defined as the vehicle protection device being positioned by the owner so as to not obstruct the vehicle door locking mechanism. The door is then closed upon the device, and the device is laterally encircled around the vehicle in which the second end of the device will secure to the middle of the device by a device locking mechanism disposed on the middle of the device that is outside of the door side panel previously discussed. This device will provide protection of the vehicle's front, sides, and rear panels while allowing the consumer the benefit of single person installation.

The device first end is defined as the device portion not located at the exterior of the vehicle when installed. This may include, but not be limited to, the securing method to an interior surface of a vehicle window and a cut away hole located between a vehicle door and frame. The device middle is defined as the area where the device locking mechanism is located at the exterior of a vehicle when device is installed. The second end is defined as the external area of the device beyond the device locking mechanism.

In one or more embodiments, the device first end has a securing method to attach the first end to the interior surface of a vehicle window. For example, the first end may include a suction cup with a smaller strip of material attached to the first end of the device, a hook or loop fastener strip (with the opposite hook or loop strip attached to the interior surface of the vehicle window) with a smaller strip of material attached to the device, or reusable adhesive attached to the end of a smaller strip of material attached to the device. For example, FIG. 1 depicts one embodiment in which a suction cup 104 is fastened to a smaller strip 108 which is fastened to the first end 101 of the device.

Figure 4:
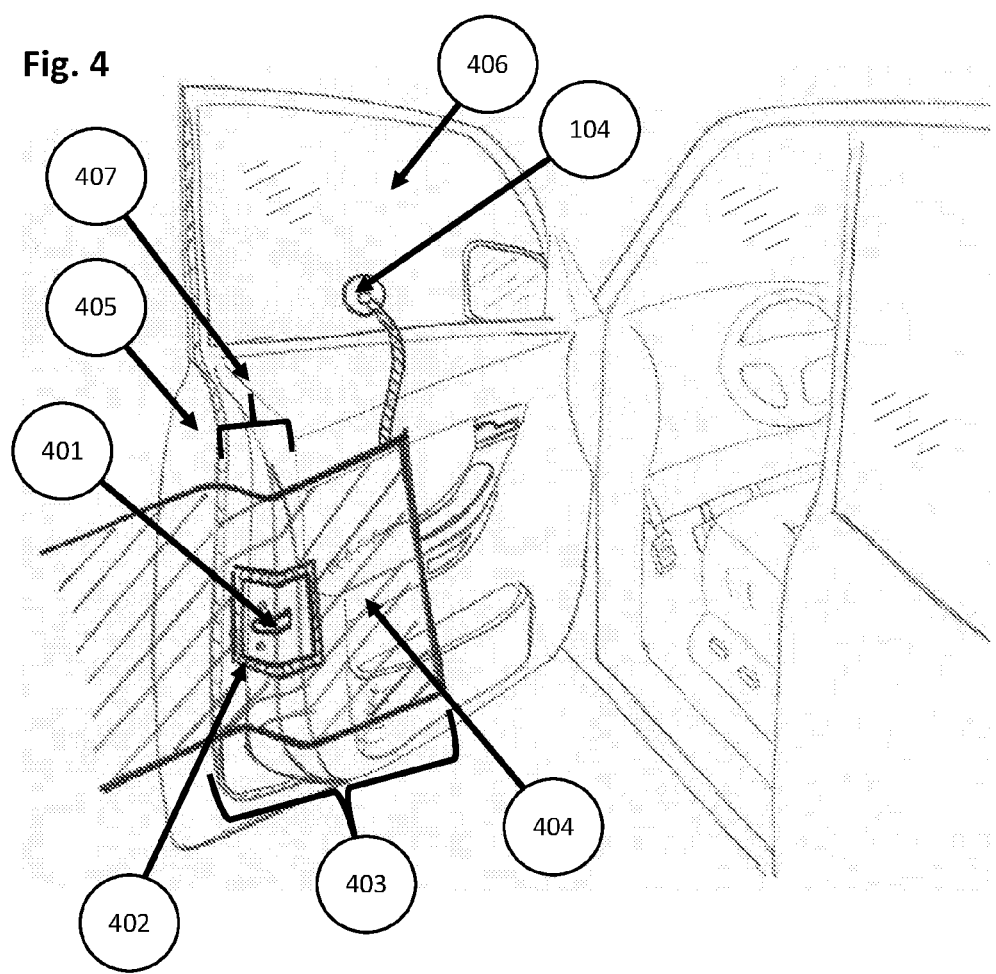
FIG. 4 illustrates one embodiment in which a vehicle protection device first end attaches to the surface of the vehicle interior window from the interior view of the device.
Figure 5:
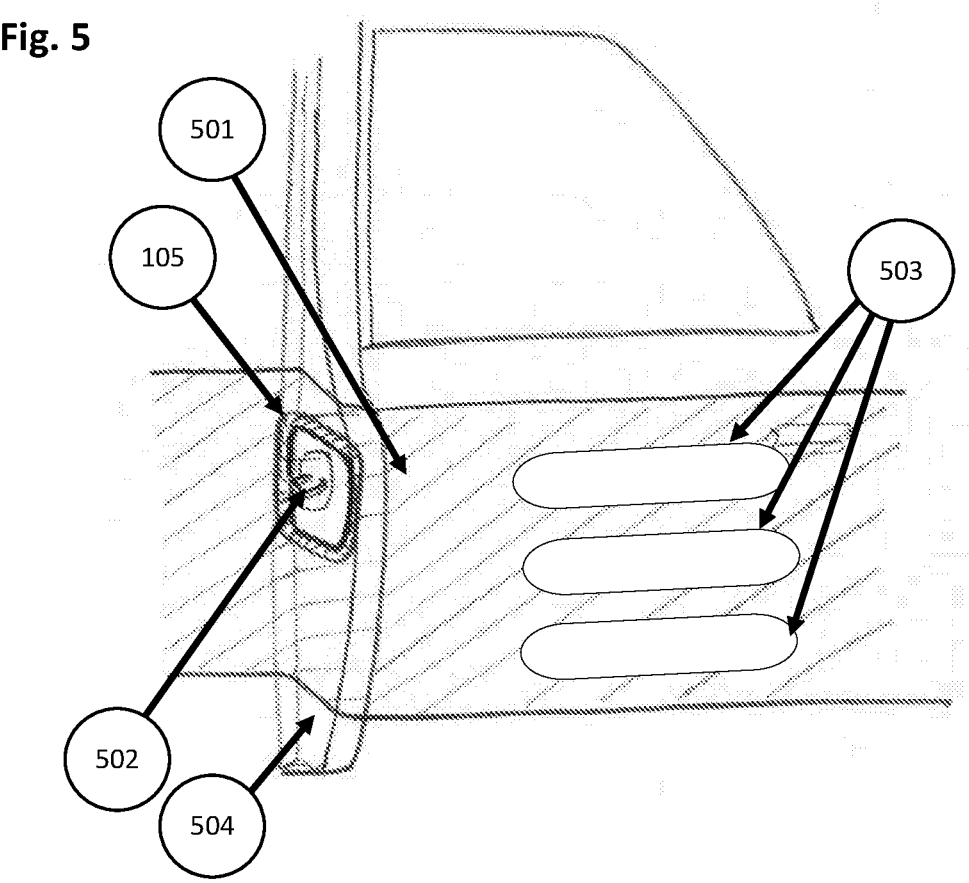
FIG. 5 illustrates the outer view of FIG. 4. This includes one embodiment of a vehicle protection device with a strategically placed cut away hole as to not obstruct the ability of the vehicle door to close.

The first end 101 of the device may be secured to the interior surface 406 of the vehicle window 204. Then the device 101 may be pulled through door side panel 407 providing the starting point for the device 101 that will later laterally encircle the exterior of the vehicle 201. The device first end 101 may be aligned as to not obstruct the vehicle door locking mechanism which comprises the vehicle door latch 401 and vehicle door striker 502. Then the door 405 will be closed upon the device first end 101 leaving the second end 103 at the exterior of the vehicle 205. The device first end 101 may include a non-obstructing hook (not shown) looped to the vehicle striker 502 of a common door locking mechanism with a cut away 402 of the device strategically placed so the common door latch 401 is not impeded by the device 403, or a strategically placed cut away 105 of the device 101 that will be aligned to allow the vehicle striker 502 and latch 401 of the door locking mechanism to make contact and lock the vehicle door 304 upon closing so as to not obstruct the door locking mechanism. Any embodiment used will not obstruct the door from closing and will provide anti-theft protection of the device 201 as the vehicle door locking mechanism will secure the device 101 to the vehicle 205. For example in FIG. 3, the cut away hole 301 location is visualized between the vehicle door 304 and frame 305. Another embodiment of the cut away 402 is visualized by FIG. 4. This embodiment depicts the inner view of a reinforced edge cut away hole 402 that is strategically aligned to not obstruct the vehicle door latch 401 disposed within the vehicle door 405. Another embodiment of the cut away 105 is visualized by FIG. 5. This embodiment depicts an outer view of a reinforced edge cut away hole 105 that is strategically aligned to not obstruct the vehicle door striker 502 disposed within the vehicle door frame 504. In one or more embodiments, the cut away 105 may be formed by a hole cut out 105 of the device 101 and reinforced by stitching along the edge of the cut away hole 105 to prevent tearing. Such methods are known to ones skilled in the art and thus are not described in detail herein.

Once the device first end 101 is secure within the vehicle door 304 and frame 305, the second end 307 may be extended to laterally encircle the vehicle 201. A common problem is that each vehicle corner 206 may or may not provide contours to allow the device second end 307 to stay taught during installation. Therefore the device second end 307, depending on the make and model of the vehicle 205, may have a securing method (not shown) in which the device 307 may be secured to the exterior surface of the vehicle 205 at each vehicle corner 206 during installation. This securing method may include, but not be limited to, an elastic outer side of the strip (not shown), an elastic upper and lower edge of the strip (not shown), elastic segments (not shown) of the device 201 strategically placed along the second end 307 where the vehicle corner 206 is likely to come in contact, or suction cups (not shown) located either on the interior surface 404 or on a smaller attached strip (not shown) on the device second end 103 or both (not shown). These methods will allow the operator to secure the device 201 to the corners of the vehicles 206 while ensuring the device will stay taught during installation.

Figure 3:
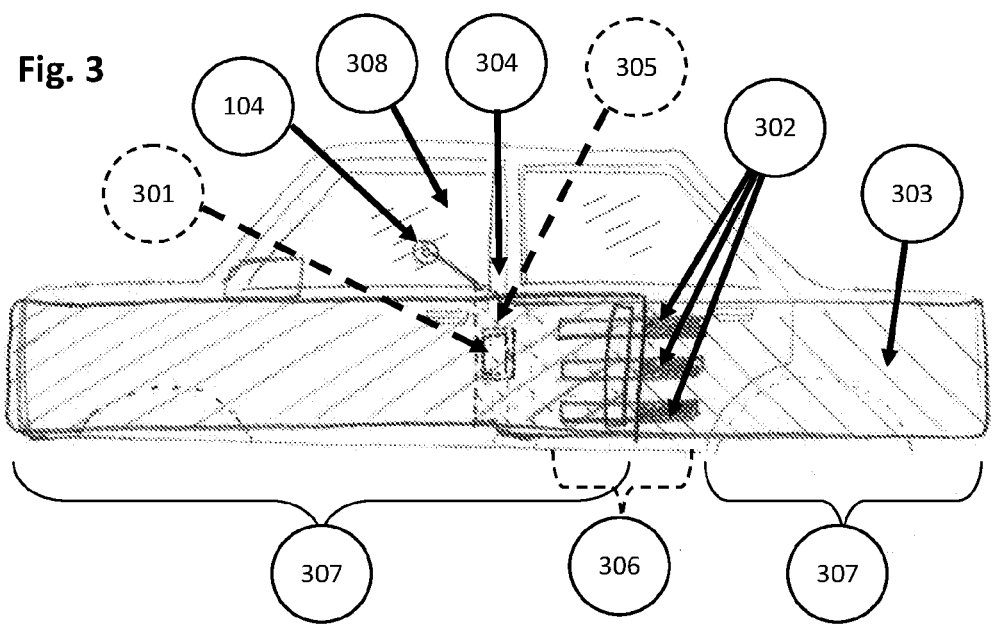
FIG. 3 illustrates one embodiment of a locking mechanism in which either three hook or three loop strips are fastened horizontally to a middle of a vehicle protection device and the opposite hook or loop strip is fastened vertically at the second end of the device.

Once the vehicle 205 is laterally encircled with the device second end 103, the second end 307 may be secured to the device middle 306 by the device locking mechanism 202. For example in FIG. 3, the device second end 307 is secured to the device middle 306. The device locking mechanism 302 may include, but not be limited to, ties (not shown), strap and loops (not shown), straps and buckles (not shown), straps and strap ties (not shown), straps and clips (not shown), turn-key holders (not shown), and clip and loop (not shown) as to allow for the second end 307 to secure to the device middle 306. For example FIG. 3 depicts one embodiment of a securing method in which either three hook or three loop strips 302 are fastened horizontally to the device middle 306 and the opposite hook or loop strip is fastened vertically at the second end of the device 307. The now secured strip may be able to stay taught to ensure a snug fit and thus concludes the installation. A snug fit is defined as the device 201 being taught enough that the device 201 will not slip off the contours and corners 206 of the vehicle 205.

The vehicle protection device may include a strip composed of a weatherproof, flexible, elastic, tear proof (or tear resistant), and impact absorbing material, such as polyvinyl chloride (PVC), polyester, neoprene or combinations thereof, for example. In one or more embodiments, the strip is formed of at least two materials, such as a PVC backed polyester. For example, PVC backed polyester is an example of a material is that is flexible and durable enough to protect an underlying product from dents and scratches upon impact. Therefore, impact absorbing material shall be defined as any material that is flexible and durable enough to resist an impact and protect the underlying product from dents and scratches. Other flexible materials are contemplated for use in embodiment description herein.

The installation process may be designed to be installed by a single operator. This operator may attach the first end 403 of the device 404 to the interior window surface 406 of the vehicle 205, pull the second end 103 through the door side panel 407, align the cut away hole 402 properly, close the vehicle door 405 upon the device 404, encircle the device 201 around the vehicle 205, and secure the second end 103 to the device middle 102 by the device locking mechanism 503 without the aid of a secondary person.

Furthermore, the device may be embellished. Such embellishment may include, but not be limited to, screen printing an image on the device, encapsulating the device within an exterior embellished sleeve, pressing an image along the second end, incorporating snaps along the second end for embellishment interchangeability, or acid or burn etching an image directly onto the second end.

The elastic device material may be designed for ease of storage. The device may be rolled, folded, or collapsed for storage purposes and to ensure a snug fit around a vehicle.

The weatherproof, and tear proof (or tear resistant) material, may be designed to withstand elements such as temperature, moisture, wind, ice, and direct sunlight while providing the consumer the benefits of antitheft of the vehicle protection device by installation starting from within the vehicle, through the door side panel, surrounding the door locking mechanism without the concern for vandals tearing the material away from the vehicle.

What is claimed is:

1. A temporary vehicle protection device comprising:
    a flexible form fitting strip of impact absorbing material adapted to encircle a vehicle when parked thus protecting the front, sides, and rear of the vehicle and wherein the device secures to itself upon closure by a device locking mechanism;
    the flexible form fitting strip comprising a first end, a middle, and a second end;
    a cut away hole on the first end adapted to prevent obstruction of a door locking mechanism;
    wherein the device is adapted for securing to an interior surface of a vehicle window and extending through a vehicle door side panel without obstructing the door locking mechanism disposed within the vehicle to provide anti-theft; encircling the vehicle, and securing to itself by the device locking mechanism to close the strip; and
    wherein the door locking mechanism is a door striker or door latch disposed within the vehicle door or frame and wherein the cut away hole on the first end is located so as to align with the door locking mechanism on the inside of the vehicle when the device is installed.

2. The temporary vehicle device of claim 1, wherein the vehicle protection device is adapted for installation by a single person.

3. The temporary vehicle protection device of claim 1, further comprising embellishments or a decorative top layer material.

4. The temporary vehicle protection device of claim 1, wherein the strip is collapsible for storage.

5. The temporary vehicle protection device of claim 1, wherein the strip is formed of weatherproof and tear proof material.

6. The temporary vehicle protection device of claim 1, wherein the closure is adapted to tighten the impact absorbing material encircling the vehicle to ensure a snug fit.

7. The temporary vehicle protection device of claim 1, wherein the strip is formed of flexible elastic material adapted to form fit the vehicle corners and contours.

8. The temporary vehicle protection device of claim 1, wherein the strip is designed for automobiles.

9. The temporary vehicle protection device of claim 8, wherein the flexible form fitting strip comprises PVC backed polyester or neoprene.

10. The temporary vehicle protection device of claim 8, wherein the device is reinforced by stitched PVC backed polyester or neoprene.

11. The temporary vehicle protection device of claim 8, wherein the device is secured to the vehicles window by suction cup, hook and loop strips, or adhesive.

12. The temporary vehicle protection device of claim 8, wherein the device is secured to the device middle by at least one strap and loop, straps and buckle, strap and strap tie, strap and clip, turn-key holder, or clip and loop.

13. The temporary vehicle protection device of claim 8, wherein the device is secured to the front passenger side door, the rear passenger side doors, or the front driver side door.

14. A method for protecting a vehicle comprising:
a) providing a temporary vehicle protection device having a first end, middle, and a second end;
b) securing the first end to an interior surface of a window in the vehicle;
c) aligning a cut away hole in the first end with a door striker or door latch disposed within a vehicle door or frame; and
d) closing the vehicle door, wrapping excess material of the temporary vehicle protection device laterally around the vehicle, and securing the second end to a locking mechanism located on the device middle.

* * * * *